United States Patent
Rota et al.

(10) Patent No.: US 9,102,539 B2
(45) Date of Patent: Aug. 11, 2015

(54) PROCESS FOR THE PRODUCTION AND TREATMENT OF GRAPHITE POWDERS

(75) Inventors: Fabio Rota, Comano (CH); Edo Rossetti, Camorino (CH); Davide Cattaneo, Arbedo (CH); Michael Spahr, Bellinzona (CH)

(73) Assignee: Imerys Graphite & Carbon Switzerland SA, Bodio (CH)

( * ) Notice: Subject to any disclaimer, the term of this patent is extended or adjusted under 35 U.S.C. 154(b) by 235 days.

(21) Appl. No.: 13/124,173

(22) PCT Filed: Oct. 27, 2009

(86) PCT No.: PCT/EP2009/064161
§ 371 (c)(1),
(2), (4) Date: Jun. 9, 2011

(87) PCT Pub. No.: WO2010/049428
PCT Pub. Date: May 6, 2010

(65) Prior Publication Data
US 2011/0243832 A1 Oct. 6, 2011

(30) Foreign Application Priority Data
Oct. 27, 2008 (EP) .................................... 08167673

(51) Int. Cl.
*C01B 31/04* (2006.01)

(52) U.S. Cl.
CPC ............. *C01B 31/04* (2013.01); *C01B 31/0407* (2013.01)

(58) Field of Classification Search
USPC ........................................................ 423/448
See application file for complete search history.

(56) References Cited

U.S. PATENT DOCUMENTS

| | | | |
|---|---|---|---|
| 933,944 A | 9/1909 | Acheson | |
| 4,592,968 A * | 6/1986 | Taylor | ........................... 429/509 |
| 6,783,747 B1 | 8/2004 | Sudo et al. | |
| 7,008,526 B2 | 3/2006 | Kanno et al. | |

FOREIGN PATENT DOCUMENTS

| | | |
|---|---|---|
| CA | 2192429 | 6/1997 |
| CN | 1 834 205 A | 9/2006 |
| EP | 1 961 700 A1 | 8/2008 |
| GB | 678134 | 8/1952 |
| GB | 796236 | 6/1958 |

(Continued)

OTHER PUBLICATIONS

Hamada, Takeshi; Suzuki, Kimihito; Kohno, Taro, and Sugiura, Tsutomu, "Coke powder heat-treated with boron oxide using an Acheson furnace for lithium battery anodes", Carbon, vol. 40, No. 13, 2002, pp. 2317-2322.

(Continued)

*Primary Examiner* — Daniel C McCracken
(74) *Attorney, Agent, or Firm* — Finnegan, Henderson, Farabow, Garrett & Dunner, L.L.P.

(57) ABSTRACT

The disclosure relates to processes for the production and thermal treatment of carbon material, in particular, graphite powders, in an Acheson type oven, using a functional filler comprising graphitic material in particulate form allowing electrical current to flow through the charge. The particulate form of the filler allows greater flexibility and can be used to control the degree of direct and indirect heating, resulting in more uniform products. Such graphite materials may typically be employed as an additive in polymers, batteries, or other applications.

17 Claims, 7 Drawing Sheets

Schematic representation of an Acheson type oven

(56) References Cited

FOREIGN PATENT DOCUMENTS

| | | |
|---|---|---|
| GB | 2 185 559 A | 7/1987 |
| JP | 54-132495 A | 10/1979 |
| JP | 62-91411 | 4/1987 |
| JP | 05-078112 | 3/1993 |
| JP | 10-241679 | 9/1998 |
| JP | 2000-281444 | 10/2000 |
| JP | 2003-128405 | 5/2003 |
| SU | 1765115 A1 | 9/1992 |
| WO | WO 2010/049428 A2 | 5/2010 |

OTHER PUBLICATIONS

International Search Report and Written Opinion issued Nov. 10, 2010, in International Application No. PCT/EP2009/064161, filed Oct. 27, 2009.

Office Action for related Japanese Application No. 2011-532667, dated Nov. 26, 2013.

Final Notice of Reasons for Rejection issued by Japanese Patent Office in corresponding Japanese Patent Application No. 2011-532667, dated Aug. 6, 2014.

* cited by examiner

Schematic representation of an Acheson type oven

Schematic representation of an Acheson type oven charged in the conventional manner.

Schematic representation of an Acheson type oven wherein the functional filler is charged around a core of carbonaceous material to be treated.
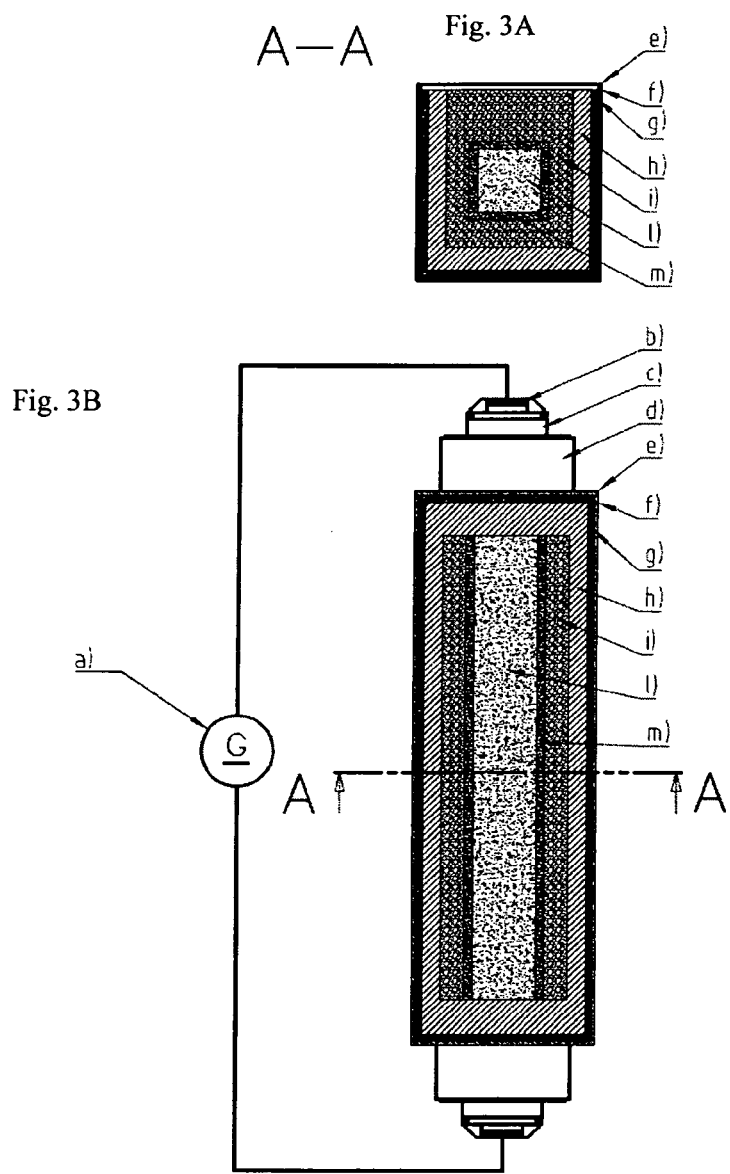

Schematic representation of an Acheson type oven wherein the functional filler and the carbonaceous material to be treated are charged in the form of a mixture.

Schematic representation of an Acheson type oven wherein the functional filler is charged in the form of layers between the carbonaceous material to be treated.

Schematic representation of an Acheson type oven wherein the functional filler is charged in the form of two bars surrounded by carbonaceous material to be treated.

Schematic representation of an Acheson type oven wherein the carbonaceous material to be treated is placed in graphite containers which are embedded within the functional filler.

PROCESS FOR THE PRODUCTION AND TREATMENT OF GRAPHITE POWDERS

This application is a U.S. national stage entry under 35 U.S.C. §371 from PCT International Application No. PCT/EP2009/064161 filed Oct.27, 2009, and claims priority to and the benefit of the filing date of EP Application No. 08167673.6 filed Oct.27, 2008, the subject matter of both of which is incorporated herein by reference.

FIELD OF THE INVENTION

The present invention relates to a thermal treatment apparatus and novel methods for the production and treatment of carbon material, in particular graphite powders, employed as an additive in polymers, batteries or other applications.

BACKGROUND OF THE INVENTION

In recent years the demand for new graphite materials with increased performance in many domains has been creating a need for new production technologies. Two important factors in this regard are flexibility and productivity. Particularly, the development of graphite for anodes in Li-ion batteries has seen increased attention in this domain.

The Acheson technology (U.S. Pat. No. 933,944) developed in the early 20th century describes a process for heat treatment of carbonaceous materials by resistive heating. The process based on the graphitization of coke in the presence of a binder, however, shows its limits. The graphitized carbon (graphite) has to be ground. The produced graphite is characterized by a rather active surface as a result of the fresh grinding.

Basically, all graphitization processes based on Acheson suffer from high investment and costly handling of this batch process. Moreover, it is known that the production of a homogeneous product requires special attention when separating the outer shell composed to a large extent of silicon carbide as described in the Acheson patent.

The thermal treatment of carbonaceous material in an Acheson furnace as illustrated in FIG. 1 occurs by two different mechanisms: 1) resistive heating (joule effect or direct heating) and 2) thermal conduction (indirect heating). The charge of an Acheson oven normally consists of a carbonaceous material to be treated, where carbonaceous material is positioned around a core of graphite (consisting of solid rods or bars), wherein the core is lined up between the electrodes which supply electrical energy (see FIG. 2). The core allows electrical current flow between the electrodes, by which the solid core material is heated up by resistive heating. The graphitization process starts in the contact surface area between the core and the carbonaceous material surrounding the core, and is induced by indirect heating of the carbonaceous material by thermal conduction from the hot core. The ohmic resistivity of the carbonaceous material around the core is decreased with proceeding graphitization, and, consequently, the heating of the contact area becomes more and more a result of direct heating. In summary, the graphitization of the carbonaceous material proceeds in a radial direction from the core to the outer surface of the carbonaceous charge of the oven. It can be easily derived from the above description that the degree of direct and indirect heating is not uniform over the radius of the oven, but the proximal parts of the carbonaceous material are subjected to more direct heating than the distal parts. The difference in heat applied to different parts of the charge of carbonaceous material over the diameter of the oven is compounded by the cooling effect of the atmosphere at the outer part of the furnace, yielding a graphitization gradient over the diameter of the furnace and, thus, a lack of homogeneity of the resulting product.

On the other hand, the Acheson process for graphitization has many advantages. For example, the equipment is robust and rarely subject to malfunctions. Thus, the Acheson process is still commonly employed in the preparation of graphitic material. However, there is a need in the art for improved preparation processes for graphitic materials, combining the advantages of the well-known equipment with a more homogenous nature of the obtained product.

CN 1 834 205 A reports on a graphitization protocol wherein the heating core is typically composed of several bars of a conductive heating core, formed by a number of 1.8 meter pieces of solid conductive carbon material. The shortcomings of this method are that by the necessity to use and arrange a number of large pieces of a solid carbon material to form the heating core the process is both cumbersome and the configurations rather limited. Accordingly, this protocol is restricted to a rather small array of products.

U.S. Pat. No. 7,008,526 covers the graphitization of pre-ground carbonaceous precursors. Since this application restricts itself to just pre-ground carbonaceous precursors, the utility of the process described therein is therefore rather limited. Furthermore, rather than an Acheson furnace, a muffle furnace is the heat source for this application and hence heating can only occur through thermal conduction (indirect heating).

GB 2 185 559 A describes a process for continuously graphitizing carbon bodies by electric resistance. The process described therein is thus fundamentally different from Acheson type processes wherein the carbonaceous material to be treated is loaded to the furnace at once and then after the end of the treatment removed from the furnace.

SU 1 765 115 A1 describes a further method for heat treating carbonaceous material wherein the furnace incorporates a "grid" of solid dielectric material for conveying the heat necessary for the treatment process. Hence, the possible process configurations are rather limited due to the sophisticated setup of the conductive elements.

U.S. Pat. No. 6,783,747 describes the use of containers whose walls are made out of graphite which are filled with the material to be graphitized. Electrical current supplied by electrodes flows through the container walls, which in turn become heated by the Joule effect. The heat generated in such a way is transmitted substantially via thermal conduction to the powder to be treated inside the box. This technique has a number of drawbacks:
  costly boxes have to used;
  high wear of the boxes by erosion due to the generation of aggressive gases in the containers;
  slow and expensive handling costs for filling, positioning and emptying the boxes.

Having regard to the state of the art, there remains a need for an improved process wherein the desired heat treated carbonaceous product can be efficiently and conveniently prepared in an oven of the Acheson type.

SUMMARY OF THE INVENTION

The inventors have developed a process for the preparation or treatment of carbonaceous material (e.g. graphite powder) wherein the solid core of graphite in the Acheson type oven (usually consisting of rods or bars in the prior art) has been replaced with a graphitic material in particulate form. Insofar as the graphitic material serves to produce the desired resistive heating by virtue of the Joule effect observed when electrical current flows through the material, it may also be referred to as a "functional filler." Furthermore, since the use of graphite containers encasing the carbonaceous material to be treated are no longer necessary, the novel process of the present invention is consequently both more efficient and safer than the prior art.

The use of a "functional filler" in particulate form (powdered or grained material) provided by the present invention allows for greater flexibility in the choice of process parameters, facilitates control over the degree of direct and indirect heating and can be utilized in numerous configurations that will now be described in greater detail below in order to illustrate the invention.

In one aspect, the present invention provides processes for the thermal treatment of carbonaceous material in an oven of the Acheson type, characterized in that in addition to the carbonaceous material to be treated a functional filler consisting essentially of graphitic material in particulate form is added to the reactor for allowing electrical current to flow through the charge.

Typically, the graphitic material of the functional filler has an average particle size ranging from about 1 μm to about 10 mm, preferably from about 10 μm to about 1 mm. The functional filler of the present invention is thus mainly composed of conductive graphitic material, but may also contain some additives commonly employed in graphitization or graphite treatment processes.

The carbonaceous material obtained from the processes of the invention is typically characterized by an increased homogeneity compared to material obtained with conventional processes. Moreover, the processes of the present invention offer a convenient way to adjust the properties of the obtained material by virtue of controlling the degree of direct and indirect heating of the carbonaceous material during the thermal treatment. The latter is achieved by appropriately arranging the material to be treated and the functional filler inside the Acheson type furnace, as will be explained in more detail below. Through the possibility of "fine-tuning" the arrangement of functional filler and material to be treated, basically any degree of direct to indirect heating can be achieved, dependent on the desired properties of the obtained product.

It is thus also readily apparent that the novel process provided by the present invention allows to achieve a more uniform heating within the oven of the Acheson type.

In some embodiments, the carbonaceous material is a material to be graphitized by the process of the invention. In other embodiments, the carbonaceous material is a graphitic material to be heat-treated and/or purified by the process of the invention. Preferably, the carbonaceous material to be processed and/or the functional filler will essentially be of homogeneous particle size, i.e. with a narrow particle size distribution. The latter is clearly advantageous in order to separate the treated material from the functional filler present in the reactor.

The processes of the present invention, are typically carried at temperatures of about 2000° up to 3500° C. Preferably, the temperature for graphitization in an Acheson type process is more than about 2500° C.

In addition to the functional filler and the carbonaceous material to be treated, the processes may employ another carbonaceous material as a bulk insulator material, i.e. having a low electrical conductivity. Once again, said bulk insulation material is typically in particulate form and preferably essentially of essentially homogeneous particle size.

In certain embodiments, the control of the degree of direct and indirect heating is achieved by charging the carbonaceous material to the Acheson type oven in the form of a mixture consisting of a) the carbonaceous material to be treated, and b) the functional filler consisting of graphitic material in particulate form allowing electrical current to flow through the charge.

In some embodiments, the mixture of a) and b) is comprised of the functional filler in an amount which overcomes the percolation threshold of the resulting mixture. The percolation threshold depends on the specific properties of the two materials, and can be easily determined by those of skill in the art. In most cases, a content of at least 5% of the functional filler will be necessary to obtain a sufficient conductivity of the mixture. Of course for embodiments where the carbonaceous material to be treated is graphitic material and thus already conductive, less or even no functional filler at all needs to be added to the graphitic material to be treated.

In other embodiments, the degree of direct and indirect heating of the carbonaceous material to be treated is controlled through the mutual three-dimensional arrangement of the graphitic material and the carbonaceous material to be heat treated.

In certain embodiments, the degree of direct and indirect heating in the process is controlled by charging the carbonaceous material to be treated to the Acheson type oven in the form of layers separated by one or more layers of a graphitic material, with the graphitic material in particulate form acting as a functional filler enabling the desired electrical current flow. Preferably, the layers of carbonaceous material and graphitic material are positioned in an alternating manner when viewed in a cross-section of the Acheson type oven.

In other alternative embodiments the degree of direct and indirect heating in the process is controlled by charging the carbonaceous material to the Acheson type oven in the form of a core "bar" (consisting of particulate material), wherein said core bar is surrounded by the functional filler allowing electrical current flow.

In yet further alternative embodiments, the degree of direct and indirect heating in the process can be controlled by charging the carbonaceous material to be treated to the Acheson type oven, and disposing the graphitic material in particulate form between the electrodes in the form of one or more "bars" allowing electrical current flow. In a preferred embodiment, the "bars" of the graphitic material are of rectangular shape when viewed in a cross-section. Of course, the functional filler goes into the process in particulate form and at the end of the process is removed in particulate form.

In any of the above embodiments, the graphitic functional filler and the carbonaceous material may conveniently be of different grain size, thereby allowing the separation of the treated carbonaceous particles from the functional filler particles through standard techniques available in the art. In a preferred embodiment, the content of the cold oven after the thermal treatment is classified through sieves having mesh sizes corresponding to the grain sizes of the employed filler and carbonaceous materials, respectively.

In certain embodiments, a carbonaceous material with low conductivity in particulate form is added in addition to the carbonaceous material to be treated and the functional filler to the reactor. Such a material is herein referred to as a solid bulk insulation. In preferred embodiments said carbonaceous material acting as a solid bulk insulation has low electrical conductivity. Suitable examples are coke (such as petroleum coke), anthracite and the like.

In yet other embodiments, the carbonaceous material can be charged to the Acheson type oven within graphitic containers, wherein the graphitic containers are embedded into a graphitic material in particulate form allowing electrical current flow (functional filler).

In any of the above embodiments, the carbonaceous material and/or the graphitic material acting as the functional filler may further contain one or more catalyst compounds, nucleating agents, binders, coatings or any other additives commonly employed in such processes.

Representative forms of carbonaceous material include coke (green or calcined), petroleum coke, pitch coke, carbonized wood or other biogenic products, needle coke, sponge coke, metallurigical coke, coal tar based carbons and mesocarbons, anthracite, synthetic graphite, natural graphite,expanded graphite. carbonized polymers, carbon black or combinations thereof.

Representative forms of the graphitic material suitable for treatment or acting as the functional filler include synthetic graphite, natural graphite, expanded graphite or combinations thereof.

BRIEF DESCRIPTION OF THE FIGURES

FIG. 3 shows an Acheson type oven wherein the functional filler is charged around a core of carbonaceous material to be treated.

DETAILED DESCRIPTION OF THE PRESENT INVENTION

One of the aims of the present invention is to provide an efficient process for the preparation of substantially homogeneous graphite using an oven of the Acheson type. The inventors have found that by using a functional filler in particulate form the degree of direct and indirect heating can be manipulated, through which the properties of the obtained heat treated carbonaceous material can be fine-tuned as desired. The products obtained by the processes of the present invention can be used, for instance, in lithium-ion batteries.

The processes of the present invention provide:
an efficient and cost-effective process to heat treat carbonaceous powders and/or grains by a combination of direct and indirect heating;
an efficient and cost-effective process to purify graphite and to evacuate the impurities; and
an efficient and cost-effective process allowing greater flexibility in adjusting the heat input, in particular with regard to the degree of direct vs. indirect heating.

By employing the processes of the present invention, for example, a purified form of synthetic graphite can be produced by manipulating the spatial arrangement of the carbonaceous material and the graphitic functional filler in particulate form inside the reactor. For example, the desired degree of direct vs. indirect heating can be achieved by manipulating the layered construction of the carbonaceous material and said graphitic material (e.g., layer thicknesses, number of layers and orientation of layers), the ratio of carbonaceous material to graphitic material, or the size of the particles of the carbonaceous material and/or the graphitic material. In addition, the volume ratio between carbonaceous material and graphitic material can also be varied to achieve the desired degree of direct and indirect heating. Of course, any of these manipulations can also be used in combination.

The present invention further permits the carbonaceous material to be treated with or without pre-grinding provided the particle size is compatible with layer thickness and filling operations.

1. Furnace and Particulate Filling

Figures 1A, 1B:
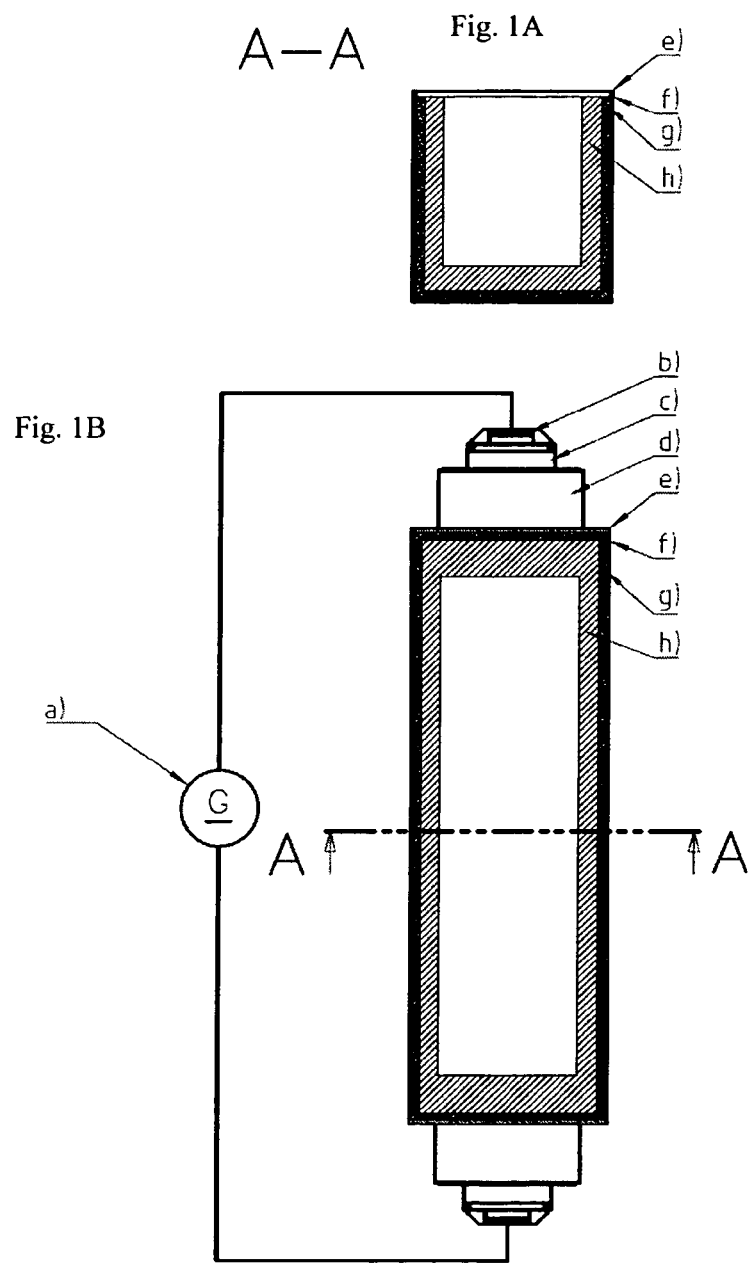
FIG. 1 shows an Acheson type oven suitable for performing the processes of the present invention.

The reactor (Acheson type oven) typically comprises a metal frame and refractory lining. The electrodes are positioned at both ends of the reactor as shown in FIG. 1.

Since the degree of direct vs. indirect heating influences the properties of the obtained material, the spatial arrangement of the carbonaceous material to be heat-treated and the functional filler inside the reactor is generally adapted in order to achieve the desired properties of the obtained material. The powders and/or grains are typically deposited by a computer guided arm which brings the materials in the selected position.

in some embodiments, the carbonaceous material and graphite functional filler in particulate form can be disposed within the oven in a plurality of alternating layers. The thickness of the various layers can be pre-programmed. Furthermore, the particle size of the respective materials in the layers can be selected based on pre-determined characteristics. These parameters as well as others known to those skilled in the art, either alone or in combination, can be selected in order to influence the hearing rates of the carbonaceous material at desirable levels.

The carbonaceous material to be treated and the functional filler in particulate form (see (l) and (m) respectively in the reference list of the figures) can for example be separated by a cardboard sheet that may remain in place before starting the heating or by metal sheets which are removed prior to starting the heating. Alternatively, the different materials can be separated by any other technique that allows them to retain their form or remain confined throughout the process. In this sense, the discrete areas defining the respective materials assume monolithic forms with no enclosing, separate physical barrier.

In other embodiments, the materials can also be present as mixed powders and/or grains having different crystallization levels, as well as materials differing by their particle size. In Acheson type processes, the insulation of the oven may not merely comprise the outer lining consisting of refractory material, but may also comprise an insulation charge around the carbonaceous material to be heat treated and the functional filler allowing the electrical current flow. As explained above, such a solid bulk insulation material is typically comprised of a carbonaceous material having a low electrical conductivity, such as petroleum coke or the like.

The control of the degree of direct vs. indirect heating can be achieved by several different spatial arrangements. For example, by charging the functional filler in particulate form around a core of carbonaceous material to be treated (see FIG.

3) and/or by adapting the thickness of the functional filler (see FIG. 3, m) and/or the carbonaceous material (see FIG. 3, I) to be treated, the progress of direct heating in the radial direction results in a decreased heat gradient during processing. The carbonaceous material is heated rapidly, and undergoes a fast graphitization over the whole thickness, so most of the heat is applied directly via resistive (i.e. direct) heating.

Figures 5A, 5B:
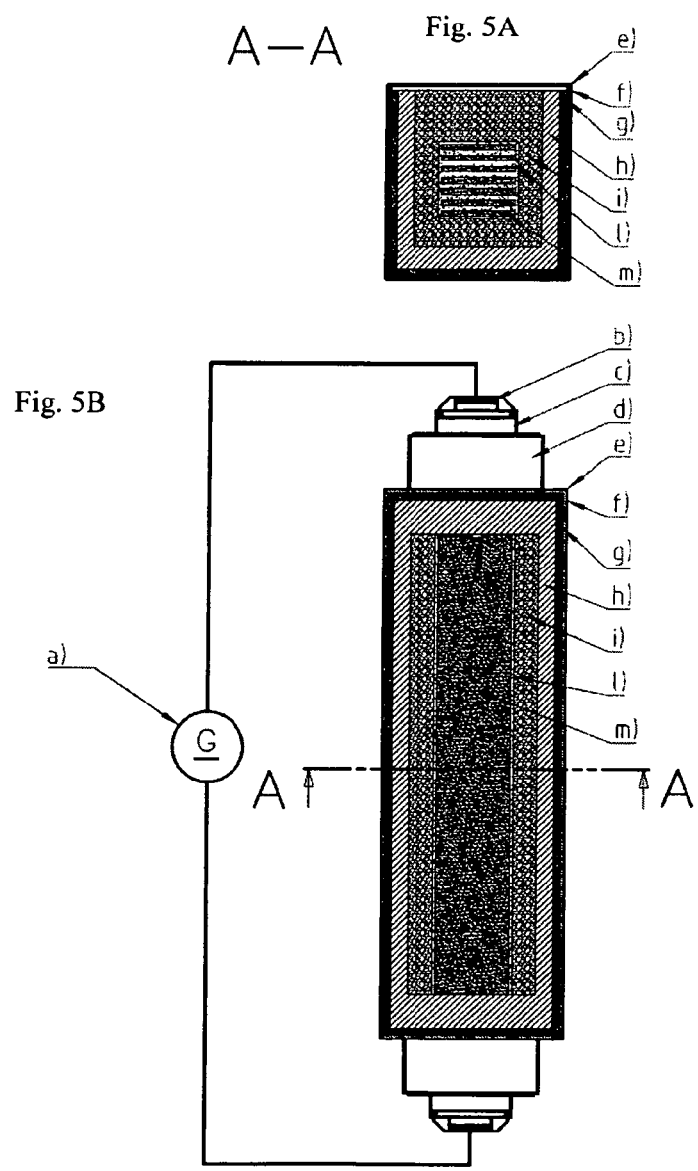
FIG. 5 shows an Acheson type oven wherein the functional filler is charged in the form of layers between the carbonaceous material to be treated.
Figure 6A:
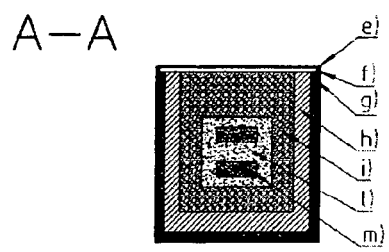
FIG. 6 shows an Acheson type oven wherein the functional filler is charged in the form of two bars surrounded by carbonaceous material to be treated.
Figure 6B:
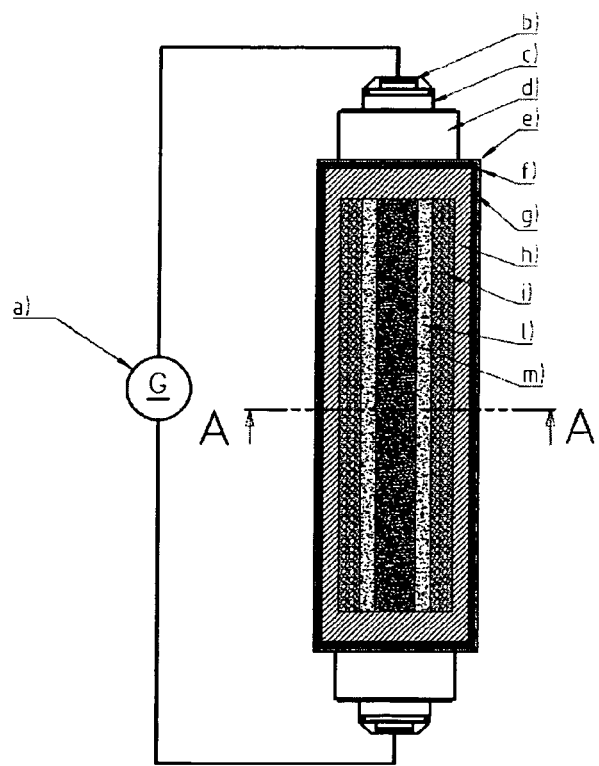

In another embodiment, the functional filler and the carbonaceous material to be treated may be charged to the oven in the form of alternating layers (see FIG. 5). Alternatively, the functional filler in particulate form may be charged in the form of "bars" (see FIG. 6), lined up between the electrodes and passing through the carbonaceous material to be treated. Again, the heat gradient over the diameter of the oven is reduced by such arrangements of the charged materials.

Figure 4A:
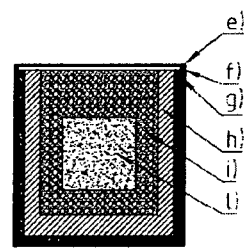
FIG. 4 shows an Acheson type oven wherein the functional filler and the carbonaceous material to be treated are charged in the form of a mixture.
Figure 4B:
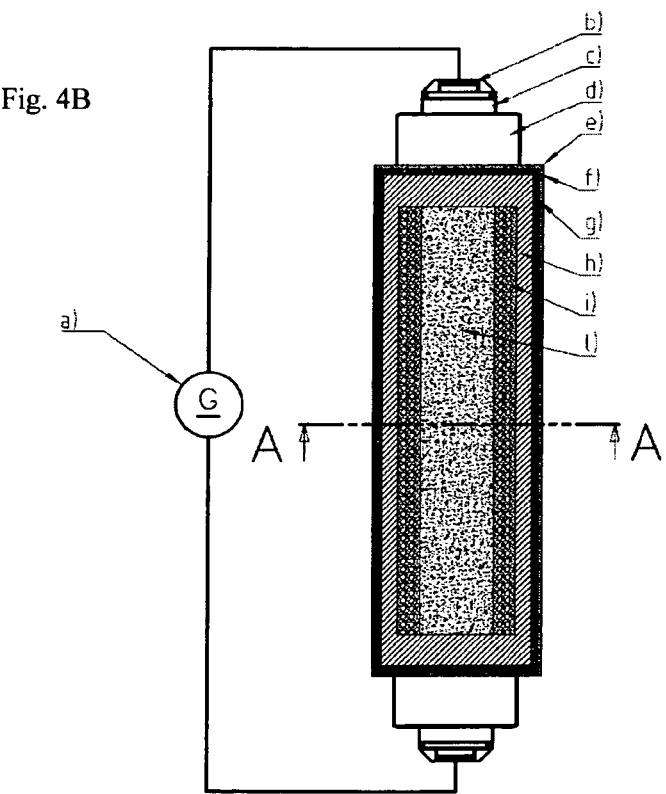

In an alternative embodiment, the functional filler and the carbonaceous material to be treated may be charged to the oven in the form of a mixture (see FIG. 4). The content of the functional filler in the mixture, as well as the grain size of the functional filler, can be varied and can be used to influence or control the rate of heating as well as the relative levels of direct and indirect heating. The type of mixture can be a determining factor for quality but also processing requirements. A mixture of a material to be treated with its already graphitized version can simplify the emptying and screening process as well as enable the operator to generate new materials by adjusting the ratio as appropriate.

A mixture of a coarser functional grade with a fine material to be treated can facilitate the screening process. While the applicant does not wish to be bound to any kind of theory, it is understood that most of the resistivity heat is developed at the contact of grain surfaces of the functional filler, and the mixture functions as a conductive composite (by blending conductive and less conductive or even insulating material), where each composition can result in a new product having been subjected to a particular thermal history. It will be understood that if the total number of contact surfaces between the functional filler grains is increased, the effect of direct heating is increased as well. Moreover, as the resistivity of the material to be treated is reduced by the heat treatment, direct heating will progressively displace indirect heating in the compositions.

In some embodiments, the carbonaceous material to be treated may already exhibit a relatively low resistivity. In such cases, it may also serve as its own functional filler.

In all of the above embodiments, the separation process of the treated carbonaceous particles from the functional filler after the end of the heat treatment can be simplified by employing functional fillers and carbonaceous materials of different grain sizes. The content of the cold oven, for example, can be classified through sieves having mesh sizes corresponding to the grain sizes of the employed filler and carbonaceous materials, respectively.

Figure 7A:
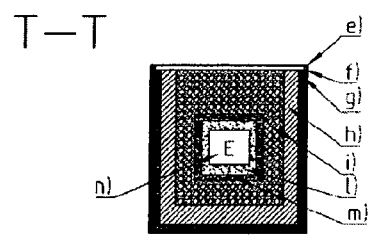
FIG. 7 shows an Acheson type oven wherein the carbonaceous material to be treated is placed in graphite containers which are embedded within the functional filler.
Figure 7B:
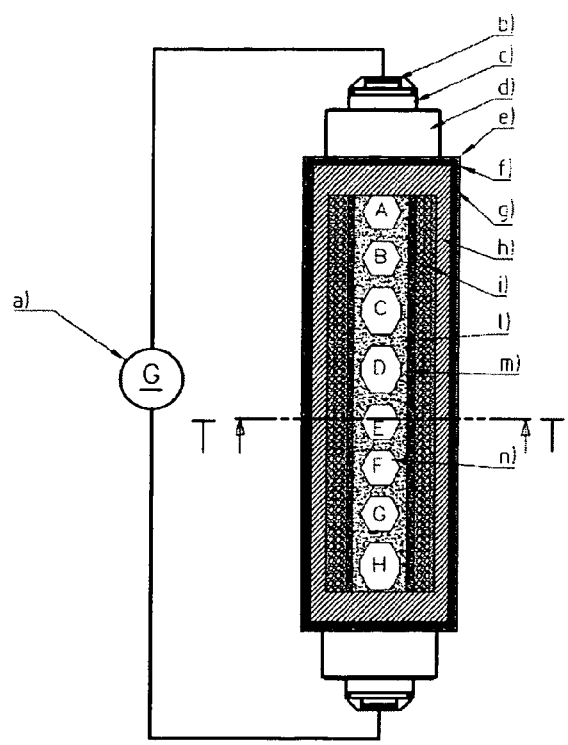

In yet another alternative embodiment, the carbonaceous material to be treated may be charged to the oven by filling the carbonaceous material into one, and preferably more than one container (FIG. 7) consisting of graphite, where the loaded containers are embedded within the functional filler inside the oven. In this embodiment, the heating of the carbonaceous material is to a large extent indirect heating, since little or no electrical current is passed through the carbonaceous material to be treated inside the graphite containers.

In any of the above embodiments, the functional filler and/or the carbonaceous material may contain one or more additional catalyst compounds to increase the rate of the intended reactions. Catalysts for graphitization are known in the art and include, but are not limited to, carbide-forming components, such as iron, silicon oxide or silicon metal, boron oxide or boron metal, aluminium oxide or aluminium metal. The functional filler and carbonaceous material also may contain binders, coatings and other additives commonly employed in this technical field.

2. Oven Design

Generally, Acheson type ovens are known in the art. For the purposes of the present invention the third solid bulk insulation illustrated in the Figures is usually comprised of a carbonaceous material with low conductivity such as petroleum coke or anthracite, or other suitable (inert) materials. In cases where the latter is in direct contact with the material to be heat treated, the particle size is generally selected to be different to allow a convenient separation at the end of the process. The second solid insulation generally consists of refractory materials such as silicon carbide or suitable metal oxides.

For the purposes of the present invention, it may be advantageous to use Acheson type ovens of a smaller size than usually employed. Since the energetic efficiency of the standard Acheson process is not very high, graphitization is frequently performed in very large ovens having a total load in the range of about 100 tons of carbonaceous material to be graphitized. However, for the purpose of arriving at a reactor charge having a defined three-dimensional arrangement or shape as described herein, it will often be easier to perform a controlled charging and discharging of the oven if smaller-sized ovens are employed.

3. Results

It was found that direct and indirect heating impart quite different characteristics to the heat treated material. This is illustrated by the results obtained from experiments wherein the carbonaceous material was treated only by direct heating, whereas in another experiment, the same carbonaceous input material was treated only by indirect heating in an otherwise similar setup. Direct heating was performed according to the arrangement described in FIG. 4. Indirect heating has been performed according to the arrangement described in FIG. 7

As can be seen from the results shown in the table below, direct heating generates—for amorphous carbon starting materials with a similar particle size after graphitization—a material with higher crystallinity, as indicated by a higher Xylene density, a higher thickness of crystalline graphite domains Lc, a higher specific BET surface area, as well as a lower graphite interlayer distance c/2, than for the material graphitized by indirect heating. On average larger graphitic layers, but at a lower average interlayer distance were observed; and the ratio of surface area/particle size indicates a slightly higher porosity in the case of direct heating. Detailed parameters obtained from these experiments are listed in Table 1.

TABLE 1

Parameters determined for starting materials and treated materials.

| Graphite property | unit | Before heating | After direct ohmic heating | After indirect heating |
|---|---|---|---|---|
| Xylene density | g/cm$^3$ | 2.07 | 2.257 | 2.252 |
| Lc | nm | 3 | 130 | 100 |
| c/2 | nm | 0.3489 | 0.3356 | 0.3360 |
| BET Surface Area | m$^2$/g | 4.8 | 2.8 | 2.2 |
| Average particle size | μm | 14.4 | 14.4 | 12.8 |

It is evident from the observed variations of the educt and product parameters that it is possible to select desired product parameters, such as the degree of crystallinity by choosing adequate reaction conditions, in particular, by selecting a desired ratio of direct and indirect heating in the processes of the invention.

4. Advantages of the Present Invention

1. The use of a functional filler consisting essentially of graphitic material in particulate form facilitates electrical current flow through the charge of carbonaceous material and also allows for significant flexibility in the process configuration.

2. The use of said functional filler along with the spatial arrangement of said carbon based components enables control over the degree of direct and indirect heating which in turn allows the parameters of the product to be selected as desired.

3. Pre-grinding of the carbonaceous material is not necessary so long as the particle size is compatible with the other process parameters (namely the functional filler and third solid bulk insulation).

To the best of applicant's knowledge, processes treatment of carbonaceous material, wherein a functional filler consisting essentially of graphitic material in particulate form is added to the reactor for allowing electrical current to flow through the charge have not been described in the prior art.

It will be apparent to those of skill in the art that many modifications and variations of the embodiments described herein are possible without departing from the spirit and scope of the present invention. The present invention and its advantages are further illustrated in the following, non-limiting examples.

EXAMPLES

Example 1

Figures 2A, 2B:
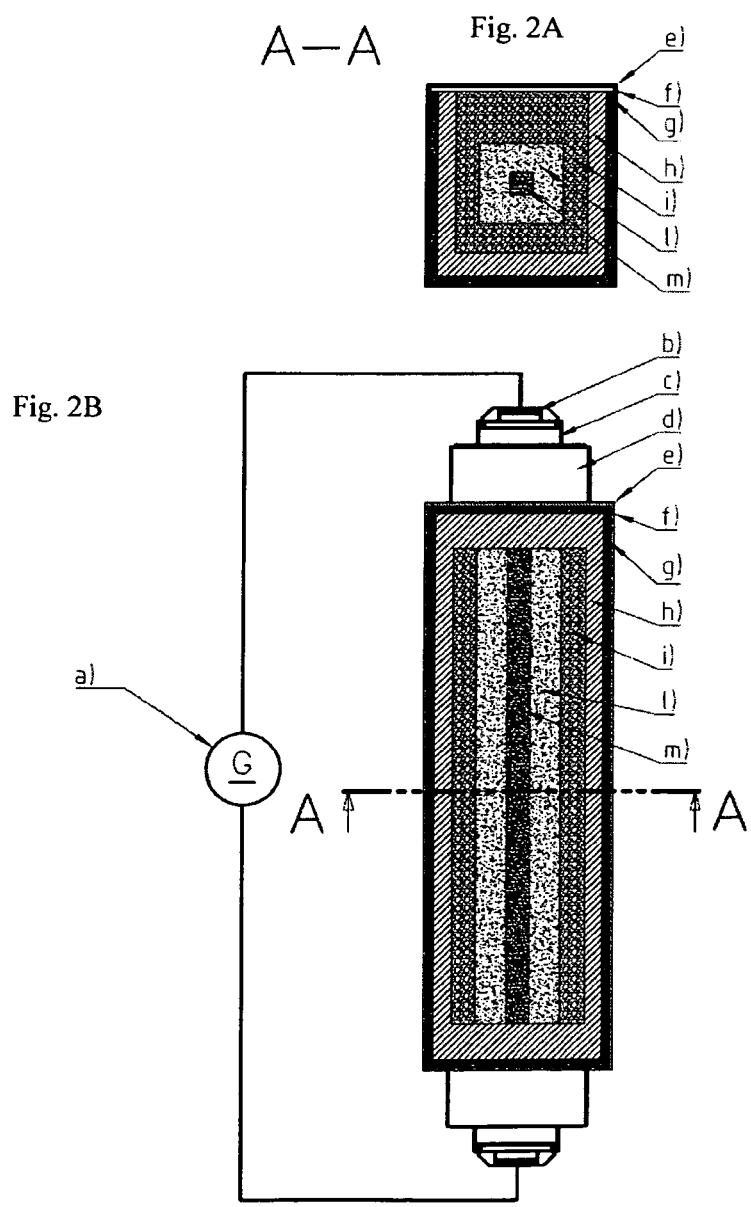
FIG. 2 shows an Acheson type oven charged in the conventional manner, wherein the core of graphite is surrounded by the carbonaceous material to be treated.

The material to be treated according to a conventional Acheson type process setup was placed on the outside of a more electrically conductive core material as illustrated in FIG. 2. The properties of the starting material and of the product obtained after direct heating are given in Table 2 below:

TABLE 2

Properties of starting material and final product after treatment in an arrangement according to FIG. 2:

| | Raw material: Calcined coke | Final product: |
|---|---|---|
| Ashes Content (%) | 0.102 | 0.004 |
| Volatiles Content (%) | 1.14 | |
| Pour Density (g/cc) | 0.594 | 0.614 |
| Xylene Density (g/cc) | 2.084 | 2.250 |
| Lc (nm) 002 | 3 | 147 |
| c/2 (nm) 002 | 0.3466 | 0.3359 |
| d10 (μm) | 9 | 8.8 |
| d50 (μm) | 23.9 | 23.0 |
| d90 (μm) | 50.9 | 48.3 |
| Nitrogen Surface Area ($m^2/g$) (BET SSA) | 4 | 1.40 |
| Fe Content (ppm) | 400 | 67 |

Eample 2

In general, the same reactor type and starting materials as in Example 1 were used. However, in this experiment the material to be treated was on the inside of the more electrically conductive filler material as illustrated in FIG. 3. The properties of the starting material and the product are given in Table 3 below:

TABLE 3

Properties of starting material and final product after treatment in an arrangement according to FIG. 3

| | Raw material: Calcined coke | Final product |
|---|---|---|
| Ashes Content (%) | 0.102 | 0.004 |
| Volatiles Content (%) | 1.14 | |
| Pour Density (g/cc) | 0.594 | 0.614 |
| Xylene Density (g/cc) | 2.084 | 2.237 |
| Lc (nm) 002 | 3 | 71 |
| c/2 (nm) 002 | 0.3466 | 0.3361 |
| d10 (μm) | 9 | 8.8 |
| d50 (μm) | 23.9 | 23.0 |
| d90 (μm) | 50.9 | 48.3 |
| Nitrogen Surface Area ($m^2/g$) | 4 | 1.80 |
| Fe Content (ppm) | 400 | 67 |

Examples 1 and 2 show that with two identical starting materials and with identical electrical input, the two different spatial arrangements (one with the conducting material inside the other with the conductive material outside) generate two different products, in particular with respect to the crystallinity (see xylene density and crystalline graphite domains Lc) and specific surface area of the product.

Example 3

Purification of different graphite qualities was carried out in an oven as shown in FIG. 1. No extra conductive nerve or core was used in this process.

Table 4 (below) illustrates the purification process of the present invention for two different graphite materials. The main physical characteristics are reported for the materials before and after heat treatment. The treated materials have been analyzed on the top of the reactor and on the bottom in order to illustrate the uniformity of the treatment. It can be observed that the overall purity given by ash content and moisture is noticeably improved independently of the type of starting material. Trace elements have disappeared and are Table 4 (below) illustrates the purification process of the present invention for two different graphite materials. The main physical characteristics are reported for the materials before and after heat treatment. The treated materials have been analyzed on the top of the reactor and on the bottom in order to illustrate the uniformity of the treatment. It can be observed that the overall purity given by ash content and moisture is noticeably improved independently of the type of starting material. Trace elements have disappeared and are below 1 ppm or no longer detectable. Vanadium although reduced, stays at a slightly higher level. Sulfur content is strongly reduced, although this may also depend on the graphite type. As illustrated by the results, no significant difference can be observed between top and bottom of the reactor, confirming that the process of the present invention produces a highly homogenous product throughout the reactor.

TABLE 4

| | | Starting material | | Final products | | | |
|---|---|---|---|---|---|---|---|
| | | Product 1 | Product 2 | Product 1 top | Product 1 bottom | Product 2 top | Product 2 bottom |
| Scott Density | g/cm³ | 0.103 | 0.185 | 0.084 | 0.084 | 0.140 | 0.134 |
| Ash Content 810° C. | % | 0.010 | 0.013 | <0.01 | <0.01 | <0.01 | <0.01 |
| Rebound | % | 13.1 | 11.1 | 18.6 | 18.6 | 10.5 | 10.2 |
| Xylene Density | kg/dm3 | 2.251 | 2.258 | 2.257 | 2.256 | 2.263 | 2.263 |
| Moisture content | % | 0.080 | 0.011 | 0.021 | 0.010 | <0.001 | 0.002 |
| Lc 002 | nm | 75 | 257 | 138 | 135 | >500 | >500 |
| C/2 002 | nm | 0.3359 | 0.3356 | 0.3358 | 0.3358 | 0.3355 | 0.3355 |
| Oilabsorption | AVG % | 141.4 | 91.5 | 157.7 | 152.7 | 98.9 | 99.6 |
| Nitrogen Surface Area | m²/g | 14.5800 | 4.0965 | 13.9886 | 13.4638 | 4.5109 | 4.4794 |
| Trace element content | Al | 16.0 | 1.0 | 0.6 | 0.7 | 0.3 | 0.3 |
| | Ca | 50.0 | 22.0 | 0.0 | 0.0 | 0.0 | 0.0 |
| | Cu | 0.0 | 0.0 | 0.0 | 0.0 | 0.0 | 0.3 |
| | Cr | 1.0 | 2.0 | 0.4 | 0.4 | 0.4 | 0.7 |
| | Co | 1.0 | 1.0 | 0.7 | 0.7 | 0.7 | 0.7 |
| | Ni | 1.0 | 4.0 | 0.5 | 0.7 | 0.4 | 0.3 |
| | Mo | 1.0 | 1.0 | 0.3 | 0.3 | 0.3 | 0.0 |
| | Si | 79.0 | 40.0 | 0.0 | 0.0 | 0.0 | 0.0 |
| | Sb | 0.0 | 0.0 | 0.0 | 0.0 | 0.0 | 0.0 |
| | As | 0.0 | 0.0 | 0.0 | 0.0 | 0.0 | 0.0 |
| | Pb | 0.0 | 0.0 | 0.0 | 0.0 | 0.0 | 0.0 |
| | Ti | 7.0 | 14.0 | 0.8 | 1.4 | 1.5 | 1.2 |
| | Fe | 48.0 | 25.0 | 0.0 | 0.0 | 0.0 | 0.0 |

REFERENCE LIST FOR FIGURES a) Power Supply
b) Electrical Connection
c) Electrode
d) Electrode Housing
e) Metal Frame of Oven
f) Flexible Insulation
g) First Insulation
h) Second Solid Insulation (refractory solids such as silicon carbide or oxides of graphite)
i) Third Solid-Bulk Insulation (consisting of a carbonaceous material with low conductivity)
l) Carbonaceous Material to be treated
m) Conductive Graphitic Material ("Functional Filler")
n) Graphite Container (containing carbonaceous material to be treated)

The invention claimed is:

1. A process for thermal treatment of carbonaceous material, the process including:
   heating a charge including the carbonaceous material, wherein, in addition to the carbonaceous material to be treated, a functional filler comprising graphitic material in particulate form is added to form a mixture for allowing electrical current to flow through the charge, and wherein at least 5% by weight of functional filler is present in the mixture; and
   separating the carbonaceous material from the functional filler following treatment of the carbonaceous material via classification.

2. The process according to claim 1, wherein said graphitic material of the functional filler has a particle size ranging from about 10 μm to about 1 mm.

3. The process according to claim 1, wherein the degree of direct and indirect heating of the carbonaceous material is controlled through a mutual three-dimensional arrangement of the functional filler and the carbonaceous material to be heat treated.

4. The process according to claim 1, wherein the carbonaceous material is charged to an Acheson oven in the form of the mixture, and the mixture comprises:
   a) the carbonaceous material to be treated, and
   b) the functional filler comprising graphitic material in particulate form allowing electrical current to flow through the charge.

5. The process according to claim 1, wherein the carbonaceous material is charged to an Acheson oven in the form of layers separated by one or more layers of said functional filler.

6. The process according to claim 5, wherein the layers of carbonaceous material and the functional filler are oriented in an alternating manner when viewed in a cross-section.

7. The process according to claim 1, wherein the carbonaceous material is charged to an Acheson oven in the form of a core bar, wherein said core bar is surrounded by the functional filler allowing electrical current flow.

8. The process according to claim 1, wherein the carbonaceous material to be treated is charged to an Acheson oven, and wherein the graphitic material in particulate form is disposed between electrodes in the form of one or more bars.

9. The process according to claim 8, wherein the bars of the graphitic material are of rectangular shape when viewed in a cross-section.

10. The process according to claim 1, wherein the carbonaceous material is charged to an Acheson oven within graphitic containers, and wherein the graphitic containers are embedded into the functional filler allowing electrical current flow.

11. The process according to claim 1, wherein the functional filler and the carbonaceous material are of different grain size, thereby allowing the separation of the treated carbonaceous particles from the functional filler particles.

12. The process according to claim 11, wherein the content of the cold oven after the thermal treatment is classified through sieves having mesh sizes corresponding to the grain sizes of the employed filler and carbonaceous materials, respectively.

13. The process according to claim 1, wherein the carbonaceous material and/or the functional filler further contain one or more catalyst compounds or other additives.

14. The process according to claim 1, wherein in addition to the carbonaceous material to be treated and the functional filler, a carbonaceous material with low conductivity in particulate form is added to the reactor as a solid bulk insulator.

15. The process according to claim 14, wherein said carbonaceous material with low conductivity is selected from petroleum coke and anthracite.

16. The process according to claim 1, wherein the carbonaceous material to be treated is a material to be graphitized.

17. The process according to claim 1, wherein the carbonaceous material is a graphitic material to be heat treated and/or purified.

* * * * *